United States Patent Office 3,372,180
Patented Mar. 5, 1968

3,372,180
PROCESS FOR THE PRODUCTION OF HYDRO-
CARBYL 2,4-DIHYDROCARBYL ALLOPHA-
NATES AND THIOLALLOPHANATES
Henri Ulrich, North Branford, Conn., assignor to The
Upjohn Company, Kalamazoo, Mich., a corporation of
Delaware
No Drawing. Filed Oct. 22, 1965, Ser. No. 502,398
18 Claims. (Cl. 260—455)

This invention relates to a novel process for the preparation of hydrocarbyl allophanates and thiolallophanates and is more particularly concerned with a process for the preparation of hydrocarbyl 2,4-dihydrocarbylallophanates and hydrocarbyl 2,4-dihydrocarbylthiolallophanates.

The novel process of the invention comprises a process for the preparation of a compound selected from the class consisting of hydrocarbyl 2,4-dihydrocarbylallophanates and hydrocarbyl 2,4 - dihydrocarbylthiolallophanates which process comprises reacting approximately stoichiometric proportions of the appropriate hydrocarbyl isocyanate and a compound selected from the class consisting of hydrocarbyl N - hydrocarbylcarbamates and hydrocarbyl N-hydrocarbyl thiolcarbamates in the presence of an alkali metal derivative of a compound having the formula RXH wherein R is lower-hydrocarbyl and X is selected from the class consisting of O and S.

In a particular embodiment of the process of the invention the hydrocarbyl N-hydrocarbylcarbamate or hydrocarbyl N - hydrocarbyl thiolcarbamate employed as starting material is generated in situ. As will be discussed in more detail later, the in situ generation of the starting material can be accomplished by reaction of the appropriate hydrocarbyl isocyanate and the appropriate hydrocarbyl alcohol or thiol. In a particularly preferred embodiment of the invention the reaction of the hydrocarbyl isocyanate and the appropriate hydrocarbyl alcohol or thiol is carried out in the presence of the alkali metal derivative of the compound RXH, wherein R and X are as hereinbefore defined, and the hydrocarbyl isocyanate is employed in sufficient amount to provide for the intermediate formation of the hydrocarbyl N-hydrocarbylcarbamate or hydrocarbyl N-hydrocarbylthiolcarbamate and for the reaction of the latter to give the desired allophanate in accordance with the process described above. These various aspects of the invention will be discussed in more detail hereinafter.

The term "hydrocarbyl" as employed throughout this specification and claims means the monovalent radical obtained by removing one hydrogen atom from a parent hydrocarbon preferably one containing from 1 to 18 carbon atoms, inclusive. The term "lower hydrocarbyl" is a group falling within the class of hydrocarbyl and is used herein to denote the monovalent radical obtained by removing one hydrogen atom from a parent hydrocarbon containing from 1 to 12 carbon atoms, inclusive.

Illustrative of hydrocarbyl are alkyl groups such as methyl, ethyl, propyl, butyl, pentyl, hexyl, octyl, decyl, dodecyl, hexadecyl, octadecyl, and the like, including isomeric forms thereof; alkenyl groups such as vinyl, allyl, butenyl, pentenyl, hexenyl, octenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cycloöcytl, and the like, including isomeric forms thereof; cycloalkenyl such as cyclopentenyl, cyclohexenyl, cycloheptenyl, and the like, including isomeric forms thereof.

The hydrocarbyl moieties in the esters produced according to the process of the invention can be substituted, in addition to substituents containing exclusively carbon and hydrogen, by one or more inert substituents i.e. groups which do not contain active hydrogen as determined by the Zerewitinoff method, J. Am. Chem. Soc. 49, 3181, 1927. Examples of such inert substituents are halo, nitro, alkoxy, alkylmercapto, and cyano. Illustrative of such substituted hydrocarbyl groups are chloromethyl, trichloromethyl, trifluoromethyl, 2-chloroethyl, 2,3 - dichlorobutyl, 5-bromooctyl, 6,7-dibromodecyl, methoxymethyl, 2-ethoxypropyl, 3-ethoxyhexyl, 2-cyanoethyl, 3-cyanopropyl, 2-methylmercaptopropyl, 4-chlorophenyl, 3-fluorophenyl, 4-cyanophenyl, 3-methoxyphenyl, 4-ethoxyphenyl, 2-chloronaphthyl, 2-methylmercaptophenyl, 3,4-dimethoxyphenyl, 3 - chlorobenzyl, 4 - fluorobenzyl, 2-methoxycyclopentyl, 3-bromocyclohexyl, 4-chlorocyclohexenyl, 2-chloropropenyl, 4-bromobutenyl, 2 - chlorovinyl, nitromethyl, 3-nitrobutyl, 4-nitrophenyl, 2-nitronaphthyl, 3-methyl-4-nitrophenyl, 3-nitrocyclopentyl, 2-nitro-1-butenyl, 4-methylmercaptobenzyl, 2-chlorobenzhydryl, 2,4-dibromobenzhydryl, and the like.

The term "alkoxy" as used through the specification and claims means alkoxy containing from 1 to 8 carbon atoms, inclusive, such as methoxy, ethoxy, propoxy, butoxy, pentyloxy, hexyloxy, heptyloxy, octyloxy, and isomeric forms thereof. The term "alkylmercapto" as used throughout the specification and claims means alkylmercapto containing from 1 to 8 carbon atoms, inclusive, such as methylmercapto, ethylmercapto, propylmercapto, butylmercapto, pentylmercapto, hexylmercapto, heptoylmercapto, octylmercapto, and isomeric forms thereof.

The numbering of the atoms within the skeleton of the allophanates and thiolallophanates, as employed throughout the specification and claims, follows the system adopted by Chemical Abstracts and is illustrated below by reference to the formula of methyl- 2,4-dimethylallophanate:

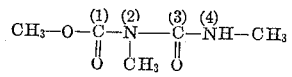

While the preparation of the allophanates generally is known in the art, no method of broad applicability to the preparation of 2,4-dihydrocarbyl allophanates has been proposed hitherto. Slotta et al., Berichte, 60, 295, 1927, prepared methyl 2,4-dimethylallophanate by cleaving 3,5-dimethyl - 2,4,6 - trioxo - 1,3,5 - oxadiazine using potassium hydroxide in methanol. This, however, is clearly not a method of general applicability to the preparation of other hydrocarbyl substituted allophanates and, as far as the production of the methyl ester itself is concerned, suffers the additional disadvantage that it requires the use of an expensive and not readily available starting material.

Kogon, J. Am. Chem. Soc., 78, 4911, 1956; J. Org. Chem., 23, 1594, 1958; ibid. 26, 3004, 1961, has described the preparation of a series of alkyl 2,4-diarylallophanates by reaction of an alkyl N-arylcarbamate with an aryl isocyanate in the presence of heavy metal salts such as lead, cobalt, and copper naphthenates. This author reported however (J. Org. Chem. 26, 3004, 1961) that the use of an alkyl isocyanate in place of the aryl isocyanate did not yield the expected 4-alkylsubstituted allophanate.

Ulrich et al. J. Org. Chem. 29, 2401, 1964 reported a modest yield of methyl 2,4-dibutylallophanate by heating butyl isocyanate with methyl N-butylcarbamate in the absence of catalyst for a prolonged period (18 hr.) at 140° C.

The present invention provides for the first time a process of broad general applicability to the preparation of hydrocarbyl 2,4-dihydrocarbylallophanates which process is characterized by its simplicity, use of easily available and inexpensive starting materials, and its ability to provide good yields of the desired allophanates. The process of the invention owes its success to a group of catalysts namely, the alkali metal derivatives of the compounds RXH wherein R and X have the significance hereinbefore defined, which have not hitherto been employed or suggested for this purpose. On the contrary, said catalysts are well-known in the art as catalysts which readily cause trimerization of isocyanates (see, for example, Michael, Berichte, 38, 22, 1905) and it is accordingly all the more surprising to find that these catalysts are useful in accordance with the present invention.

The process of the invention wherein a preformed hydrocarbyl N-hydrocarbylcarbamate or N-hydrocarbylthiolcarbamate is employed as starting material can be represented schematically as follows:

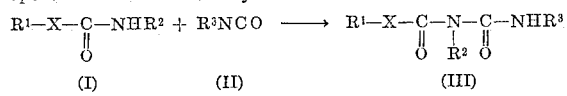

wherein $R^1$, $R^2$, $R^3$ and X are as hereinbefore defined.

For the sake of simplicity, the above equation shows the use of a monoisocyanate but it will be appreciated by one skilled in the art that a polyisocyanate (i.e. a diisocyanate or isocyanate of higher functionality) can be employed in place of the monoisocyanate and the same reaction would occur between the carbamate (I) and each of the isocyanate groups of the polyisocyanate the resulting product being a compound having a plurality of allophanyl moieties as substituents. Similarly, in place of the compound (I) which contains a single carbamoyl moiety there can be employed a compound containing a plurality of such moieties and the same reaction with the monoisocyanate (II) will take place in respect of each of the carbamoyl moieties. It will also be appreciated by one skilled in the art however that at least one of the reactants (I) and (II) must always be monofunctional, otherwise the reaction in accordance with the above equation will lead to polymerization.

In carrying out the process of the invention the carbamate (I), the isocyanate (II) and the catalyst, i.e. the alkali metal derivative of the compound RXH wherein R and X are as hereinbefore defined, are brought together advantageously in the presence of an inert organic solvent i.e. a solvent which is inert in the sense that it does not participate to any significant extent under the conditions of the reaction. Examples of such solvents are hydrocarbons which are normally liquid at about 25° C. such as hexane, octane, petroleum ethers, benzene, toluene, xylene, and the like and halogenated hydrocarbons which are normally liquid at about 25° C. such as methylene chloride, tetrachloroethane, carbon tetrachloride, chlorobenzene, o-dichlorobenzene and the like.

The carbamate (I) and the isocyanate (II) are advantageously employed in approximately stoichiometric proportions, i.e. in equivalent proportions in the case of monofunctional carbamate and monofunctional isocyanate. If desired the carbamate (I) can be employed in greater than the above proportions but such an excess offers little or no advantage and is frequently disadvantageous in terms of increased yield and rate of reaction. Preferably the isocyanate (II) is not employed in excess of stoichiometric proportion in order to avoid production of undesired byproducts due to polymerization of the isocyanate and/or further reaction of isocyanate with the final product (III).

The catalyst, i.e. the alkali metal derivative of the compound RXH wherein R and X are as hereinbefore defined, is generally employed in an amount corresponding to about 0.01% to about 5% by weight of carbamate (I). Preferably the catalyst is employed in an amount corresponding to about 0.5 to about 1.0% by weight of the combined reactants. Said catalyst can be formed conveniently by the action of the alkali metal or a derivative thereof such as the hydride, hydroxide, and the like on the compound RXH. The term "alkali metal" means sodium, potassium, and lithium. Where an alkali metal hydroxide is used to prepare the alkali metal derivative of (III) the reaction requires the elimination of water and this can be accomplished readily by azeotropic distillation using benzene, toluene, xylene, and like solvents, according to standard procedures known in the art. It is essential that the catalyst, and indeed all the reactants employed in the process of the invention, be substantially free from water to avoid unnecessary side reactions involving the isocyanate (II). The catalyst can be formed in situ in the reaction vessel before adding the other reaction compounds or it can be preformed and added as such to the other reaction components.

The reaction temperatures employed in reacting the carbamate (I) and isocyanate (II) in the presence of catalyst in accordance with the process of the invention can vary from about 20° C. to about 125° C. depending upon the nature of the particular reactants and the desired reaction rate. It is to be noted that this reaction temperature is much lower than that of prior art processes discussed above and represents one of the advantages of the process of the present invention.

In some instances the initial reaction between the carbamate (I) and the isocyanate (II) is exothermic and external cooling of the reaction mixture is frequently necessary in the early stages in order to control the temperature of the reaction mixture. The rate of increase of reaction temperature can also be controlled effectively by adjusting the rate of addition of the reactants. Preferably, but not essentially, the isocyanate (II) is added at a suitable rate to a preformed mixture of catalyst, carbamate (I) and inert organic solvent.

After the initial exothermic reaction, if such occurs, between the carbamate (I) and the isocyanate (II) has subsided, the reaction mixture can be heated at a temperature within the above indicated range to complete the reaction if this should prove necessary. The progress of the reaction can be followed by suitable analytical procedures such as infrared spectroscopy, nuclear magnetic resonance spectroscopy, and the like.

The desired allophanate (III) can be isolated from the reaction mixture by conventional procedures. For example, the inert solvent can be removed by distillation to leave a residue of the desired allophanate. The latter can be purified, if desired, by appropriate procedures such as recrystallization in the case of solids, distillation in the case of liquids, chromatography, counter-current distribution, and the like.

In a particular and preferred embodiment of the invention the carbamate (I), employed as starting material in the above described process of the invention, is generated in situ in the reaction mixture. The formation of said carbamate can be accomplished advantageously by reaction of the appropriate isocyanate $R^2NCO$, wherein $R^2$ has the significance hereinbefore defined, and the appropriate active hydrogen containing compound $R^1$—XH, wherein $R^1$ and X have the significance hereinbefore defined. Said reaction is accomplished readily, if desired in the presence of a catalyst as hereinbefore defined, employing approximately stoichiometric proportions of the two reactants under conditions well known in the art for the preparation of carbamates. The carbamate (I) so obtained is then reacted, without isolation or purification, with the isocyanate (II) in the presence of the aforementioned catalysts in accordance with the process of the invention as described above. It will be noted that the isocyanate $R^2NCO$, wherein $R^2$ is as hereinbefore defined, employed in the preparation of the carbamate (I) can be the same as the isocyanate (II) employed in the reaction with the carbamate (I), in which case the allophanate (III) will be symmetrically substituted (i.e. $R^2$ and $R^3$ are identical).

The reaction between the isocyanate $R^2NCO$ wherein $R^2$ is as hereinbefore defined, and the active hydrogen containing compound $R^1XH$, wherein $R^1$ and X are as hereinbefore defined, in the presence of inert solvent to produce the carbamate (I) is, generally speaking, an exothermic reaction at least in the initial stages. The reaction can be controlled effectively either by cooling or by adjusting the rate of addition of the reactants. Advantageously the isocyanate is added to the active hydrogen containing compound and not vice-versa. After the initial exothermic reaction has subsided the reaction can, if desired, be heated at a temperature within the range of about 25° C. to about 125° C. to complete the formation of the desired compound (I).

In this particular embodiment, the isocyanate $R^2NCO$ and the active hydrogen containing compound $R^1XH$, wherein $R^1$ and $R^2$ and X are as hereinbefore defined, are generally employed in approximately stoichiometric proportions in the formation of the carbamate (I) and the latter compound is then employed, preferably without any further treatment (such as purification and the like) in the reaction with a further proportion of the same isocyanate employed in its formation or with a different isocyanate in which case the groups $R^2$ and $R^3$ in the product allophanate will be different. The conditions employed in the reaction of the carbamate (I) and this second portion of isocyanate are those described above in describing the previous embodiment of the process of invention. The catalyst, i.e. the alkali metal salt of the active hydrogen containing compound RXH wherein R and X are as hereinbefore defined, employed in the process of the invention, can be present when the initial reaction between the isocyanate $R^2NCO$ and the active hydrogen containing compound $R^1XH$, takes place or, alternatively, can be added to the reaction mixture after the carbamate (I) has been formed in situ.

In still a further embodiment of the process of the invention the formation of the starting carbamate (I) by in situ generation can occur contemporaneously with the conduct of the main process i.e. the reaction of carbamate (I) with isocyanate (II). This particular aspect of the process of the invention is especially appropriate in those cases wherein the isocyanate $R^2NCO$, wherein $R^2$ has the significance hereinbefore defined, employed in the preparation of the carbamate (I), is the same as the isocyanate (II) employed in the conversion of the carbamate (I) to the allophanate (III). This embodiment of the invention can be carried out conveniently by reaction of approximately 2 equivalents of the isocyante $R^2NCO$ with approximately 1 equivalent of the active hydrogen containing compound $R^1$—XH wherein $R^1$ and X have the significance hereinbefore defined. The reaction is carried out in the presence of the aforesaid catalysts employed in the previously described embodiments of the invention and using the same reaction conditions and procedures. Under these circumstances the reaction of the isocyanate and active hydrogen atom containing compound to form the carbamate (I) occurs contemporaneously with the conversion of the latter to give the desired allophanate. The net result of the reactions occurring can be presented schematically as follows:

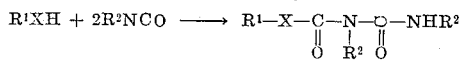

The above embodiment of the invention is especially preferred where the group $R^1$ of the active hydrogen containing compound $R^1$—XH is aryl as hereinbefore defined. In such cases the designed allophanate (III) is obtained in high yield and state of purity with a minimum of by-products.

The above embodiment is also useful wherein the group $R^1$ of the active hydrogen containing compound $R^1$—XH is alkyl, cycloalkyl, alkenyl, and other non-aromatic hydrocarbyl, but in such cases the amount of by-products produced are generally at a higher level than obtained with the compounds $R^1XH$ wherein $R^1$ is aromatic in character. The chief of said by-products are (a) the trimer derived by polymerization of the starting isocyanate and (b) the intermediate carbamate (I). The relative proportions and amounts of these by-products vary according to the nature of the starting isocyanate and are greater in some cases than in others. In all cases however the desired allophanate is the principal product of the reaction and can be readily separated from the aforementioned by-products by conventional procedures such as fractional crystallization in the case of solids, fractional distillation in the case of liquids, chromatography, countercurrent distribution, and the like.

In carrying out the above embodiment of the invention, which involves reacting the active hydrogen atom containing compound $R^1XH$, wherein $R^1$ and X are as hereinbefore defined, with the appropriate isocyanate, the catalyst employed can be advantageously the alkali metal derivative of the same active hydrogen compound as that employed as starting material. When this is the case the catalyst can be generated in the reaction vessel by conversion of a portion of the starting material $R^1XH$ to its alkali metal derivative using the procedures outlined above.

The preferred catalysts for use in all the various embodiments of the invention are the alkali metal derivatives of tertiary aliphatic alcohols; an especially preferred catalyst is potassium tertiary butoxide.

The starting materials employed in the various embodiments of the process of the invention, namely the carbamates (I), the hydrocarbyl isocyanates, and the active hydrogen containing compounds $R^1$—XH wherein $R^1$ and X are as hereinbefore defined, are well-known in the art and are obtained by methods well-known in the art.

The hydrocarbyl allophanates and thiolallophanates prepared by the process of the invention are useful for a variety of purposes. For example, by virtue of the fact that upon heating, illustratively at 150° C. to about 275° C., they decompose with regeneration of the isocyanate or isocyanates from which they have been derived originally, they represent an excellent method of storing isocyanates which in the free state would form a serious toxicity hazard. The decomposition of the allophanates (III) is illustrated by the following equation:

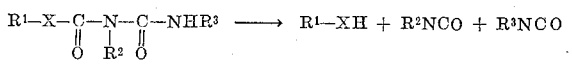

wherein $R^1$, $R^2$, $R^3$ and X have the significance hereinbefore defined. When $R^2$ and $R^3$ represent different radicals a mixture of two isocyanates will be formed whereas, in the case wherein $R^2$ and $R^3$ are identical, a single isocyanate will be formed. By appropriate choice of the radicals $R^1$, $R^2$, and $R^3$ in the allophanate it is possible to generate a mixture of the isocyanate and the thiol or alcohol $R^1XH$, the components of which mixture differ sufficiently in volatility to enable the isocyanate to be separated readily from the mixture by distillation.

Accordingly, by virtue of the above facile decomposition of the hydocarbyl 2,4-disubstituted allophanates of the invention it is possible to employ the latter compounds as ready sources of isocyanate. Thus, many of the isocyanates currently in demand for synthesis of, for example, polyurethanes, antidiabetic sulfonylureas, and as curing agents for rubber and the like, are subject to instability on storage and have to be protected from light and moisture in order to avoid degradation, polymerization and the like reactions. In addition many of the lower aliphatic isocyanates are sufficiently volatile to pose a problem of toxicity in respect of personnel charged with the handling and transport of these materials. The hydrocarbyl 2,4-disubstituted allophanates and thiolallophanates of the invention present an answer to this problem in that they enable isocyanates to be stored in a chemically combined form which is easy to handle and free from problems of toxicity and of instability to light and atmospheric moisture. Said isocyanates can be stored in this combined form indefinitely and yet can be regenerated at any desired time by simple heat decomposition.

In addition to their usefulness as sources of "instant" isocyanates the hydrocarbyl 2,4-disubstituted allophanates and thiolallophanates produced by the process of the invention can be used as stabilizers of acetal resins. For this purpose, they can be used in the place of the closely related hydrocarbyl carbamates using the procedures described in detail in U.S. Patent 3,144,431. In addition, the hydrocarbyl 2,4-disubstituted allophanates and thiolallophanates of the invention are active as insecticides and miticides and for this purpose can be formulated and employed in the control of insects and mites using formulations and procedures well-known in the art for the corresponding closely related hydrocarbyl carbamates; see, for example, U.S. Patent 3,131,215.

The following examples describe the manner and process of making and using the invention and set forth the best mode contemplated by the inventors of carrying out the invention but are not to be construed as limiting.

*Example 1.—Phenyl 2,4-dimethylallophanate*

A total of 12 g. (0.21 mole) of methyl isocyanate was added dropwise with stirring to a mixture of 18.8 g. (0.2 mole) of phenol and 0.188 g. (1% by weight based on phenol) of potassium tert.-butoxide in 50 ml. of benzene. The temperature of the reaction mixture rose from an initial value of 21° C. to a maximum value of 58° C. When the addition was complete the mixture was heated under reflux and an additional 12 g. (0.21 mole) of methyl isocyanate was added. The mixture so obtained was heated under reflux for 15 minutes before adding 200 ml. of benzene and allowing the mixture to cool to approximately 20° C. The solid (trimethyl isocyanurate) which had separated was isolated by filtration and the filtrate was evaporated to dryness. There was thus obtained 38.5 g. (92.5% theoretical yield) of phenyl 2,4-dimethylallophanate. The latter was recrystallized from methanol to obtain phenyl 2,4-dimethylallophanate in the form of a crystalline solid having a melting point of 96 to 98° C. The infrared spectrum (CHCl$_3$ solution) of this material exhibited maxima at 2.97, 5.8 and 5.92μ.

*Analysis.*—Calcd. for $C_{10}H_{12}N_2O_3$: C, 57.68; H, 5.80; N, 13.45. Found: C, 57.74; H, 5.89; N, 13.60.

*Example 2.—2,6-di-tert-butyl-4-methylphenyl 2,4-dimethylallophanate*

A total of 17.95 g. (0.31 mole) of methyl isocyanate was added dropwise over a period of 9 minutes to a stirred mixture of 66 g. (0.3 mole) of 2,6-di-tert-butyl-4-methylphenol and 0.33 g. (0.5% by weight based on phenol) of potassium tert.-butoxide in 120 ml. of benzene. The temperature of the reaction mixture varied from an initial value of 14° C. to a maximum value of 55° C. The resulting mixture was heated to reflux and an additional 17.95 g. (0.31 mole) of methyl isocyanate was added dropwise over a period of 11 minutes. The mixture so obtained was heated under reflux for a further 60 minutes before adding 700 ml. of benzene and filtering the mixture while hot. The filtrate was allowed to cool and the solid which separated was isolated by filtration. There was thus obtained 31.55 g. of 2,6-di-tert-butyl-4-methylphenyl 2,4-dimethylallophanate in the form of a crystalline solid having a melting point of 204 to 205° C. A further 58.85 g. of this material was obtained by concentration of the mother liquors from the above operation. Total yield of 2,6-di-tert-butyl-4-methylphenyl 2,4-dimethylallophanate=90.4 g. (89.4% theoretical yield). The infrared spectrum of this compound exhibited maxima at 2.98, 5.8 and 5.92μ.

*Analysis.*—Calcd. for $C_{19}H_{30}N_2O_3$: C, 68.24; H, 9.01; N, 8.35. Found: C, 68.36; H, 9.01; N, 8.20.

*Example 3.—2,6-di-tert.-butyl-4-methylphenyl 2,4-dimethylallophanate*

A total of 2.85 g. (0.05 mole) of methyl isocyanate was added slowly to a mixture of 13.85 g. (0.05 mole) of 2,6-di-tert.-butyl-4-methylphenyl N-methylcarbamate and 0.13 g. (1% by weight based on carbamate) of potassium tert-butoxide in 15 ml. of benzene and the resulting mixture was heated under reflux for 24 minutes. The mixture so obtained was allowed to cool to room temperature (circa 20° C.) and the solid (13.5 g.) which separated was isolated by filtration and was fractionally crystallized from methanol. There was thus obtained 9.86 g. (59% theoretical yield) of 2,6-di-tert.-butyl-4-methylphenyl 2,4-dimethylallophanate in the form of a crystalline solid having a melting point of 195 to 197° C.

*Example 4.—3-tert.-butylphenyl 2,4-dimethylallophanate*

A total of 12 g. (0.21 mole) of methyl isocyanate was added dropwise with stirring over a period of 20 minutes to a mixture of 30 g. (0.2 mole) of 3-tert.-butylphenol and 0.15 g. (0.5% by weight based on phenol) of potassium tert.-butoxide in 60 ml. of benzene. The initial reaction mixture temperature of 20° C. rose to a maximum of 49° C. After the addition was complete the reaction mixture was heated under reflux and a further 12 g. (0.21 mole) of methyl isocyanate was added over a period of 15 minutes. When the second addition was complete the resulting mixture was heated under reflux for a further 20 minutes before adding 200 ml. of benzene and allowing the mixture to cool to room temperature (circa 20° C.). The solid which separated was removed by filtration and the filtrate was evaporated to dryness. There was thus obtained 52 g. (99.3% theoretical) of 3-tert.-butyl-phenyl 2,4-dimethylallophanate in the form of a solid which, after recrystallization, had a melting point of 79 to 80° C. The infrared spectrum (CHCl$_3$ solution) of this material exhibited maxima at 2.98, 5.82 and 5.92μ.

*Analysis.*—Calcd. for $C_{14}H_{20}N_2O_3$; N, 10.59. Found: N, 10.59.

*Example 5.—p-Tolyl-2,4-dimethylthiolallophanate*

A mixture of 7 g. (0.04 mole) of p-tolyl N-methylthiolcarbamate and 0.035 g. (0.5% by weight based on thiolcarbamate) of potassium tert.-butoxide in 20 ml. of benzene was heated under reflux and a solution of 2.28 g. (0.04 mole) of methyl isocyanate in 10 ml. of benzene was added over a period of 6 minutes. The resulting mixture was heated under reflux for an additional 20 minutes before adding 100 ml. of benzene and allowing the product to cool to room temperature (circa 20° C.). The solid which separated was isolated by filtration and the filtrate was evaporated to dryness. The residue (8.2 g.) was recrystallized from methanol to obtain 4.5 g. (47.2% theoretical yield) of p-tolyl 2,4-dimethylthiolallophanate in the form of a crystalline solid having a melting point of 89 to 90° C. The infrared absorption spectrum of this material (benzene solution) exhibited maxima at 5.85, 5.92 and 6.02μ.

*Analysis.*—Calcd. for $C_{11}H_{14}N_2O_2S$: N, 11.75. Found: N, 11.80.

*Example 6.—2-chloro-4,5-dimethylphenyl 2,4-dimethylallophanate*

A mixture of 21.35 g. (0.1 mole) of 2-chloro-4,5-dimethylphenyl N-methylcarbamate and 0.213 g. (1% by weight based on carbamate) of potassium tert.-butoxide in 40 ml. of benzene was heated under reflux and a total of 6 g. (0.105 mole) of methyl isocyanate was added dropwise over a period of 11 minutes. The resulting mixture was heated under reflux for a further 9 minutes before being diluted with 200 ml. of benzene and allowed to cool to room temperature. The solid which separated was isolated by filtration and the filtrate was evaporated to dryness. The residue (55.8% theoretical yield) of 2-chloro-4,5-dimethylphenyl 2,4-dimethyl-allophanate in the form of a crystalline solid having a melting point of 115 to 116° C. The infrared spectrum of this material (CHCl₃) solution exhibited maxima at 2.97, 5.8 and 5.92μ.

Analysis.—Calcd. for $C_{12}H_{15}ClN_2O_3$: C, 53.24; H, 5.58; N, 10.34. Found: C, 53.46; H, 5.77; N, 10.45.

*Example 7.—α-Naphthyl 2,4-dimethylallophanate*

A mixture of 20.1 g. (0.1 mole) of α-naphthyl N-methylcarbamate and 0.2 g. (1% by weight based on carbamate) of potassium tert.-butoxide in 40 ml. of benzene was heated under reflux and a total of 6 g. (0.105 mole) of methyl isocyanate was added dropwise over a period of 3 minutes. The resulting mixture was heated under reflux for a further 12 minutes before adding 100 ml. of benzene and allowing the product to cool to room temperature. The solid which separated was isolated by filtration and the filtrate was evaporated to dryness. The residue (26.1 g.) was recrystallized from methanol to yield 13.05 g. (50.7% theoretical yield) of α-naphthyl 2,4-dimethylallophanate in the form of a crystalline solid having a melting point of 123 to 125° C. which was raised to 124 to 126° C. after further recrystallization from methanol. The infrared spectrum of this material (CHCl₃ solution) exhibited maxima at 2.97, 5.8 and 5.92μ.

Analysis.—Calcd. for $C_{14}H_{14}N_2O_3$: C, 65.11; H, 5.46; N, 10.80. Found: C, 64.90; H, 5.45; N, 10.66.

*Example 8.—Methyl 2,4-dimethylallophanate*

A solution of 24 g. (0.42 mole) of methyl isocyanate in 20 ml. of toluene was added dropwise with stirring over a period of 7 minutes to a mixture of 6.4 g. (0.2 mole) of methanol, 0.128 g. (0.00092 mole) of p-nitrophenol and 0.064 g. (0.00057 mole) of potassium tert.-butoxide in 20 ml. of toluene. The initial temperature of 26° C. rose to a maximum of 70° C. The resulting mixture was heated under reflux for 40 minutes before being cooled to approximately 38° C. at which point a further 12 g. (0.21 mole) of methyl isocyanate was added. The mixture so obtained was heated under reflux for 10 minutes then treated with 100 ml. of benzene and allowed to cool to circa 20° C. The resulting mixture was filtered and the filtrate was evaporated to dryness. The residue was subjected to fractional distillation to obtain 12.45 g. (43% theoretical yield) of methyl 2,4-dimethylallophanate having a melting point of 47° C. A total of 6.9 g. of methyl N-methylcarbamate was also obtained in the fractional distillation.

*Example 9.—2,6-di-tert-butyl-4-methylphenyl 2-methyl-4-hexylallophanate*

Using the procedure described in Example 3, but replacing methyl isocyanate by hexyl isocyanate, there is obtained 2,6 - di - tert. - butyl - 4 - methylphenyl 2-methyl-4-hexylallophanate.

Similarly, using the procedure described in Example 3, but replacing methyl isocyanate by cyclohexyl isocyanate, allyl isocyanate, benzyl isocyanate, phenyl isocyanate, p-nitrophenyl isocyanate, 3-cyanophenyl isocyanate, p-methoxyphenyl, isocyanate, p-methylmercaptophenyl isocyanate, 2,4-dichlorophenyl isocyanate or 2-naphthylmethyl isocyanate, there are obtained:

2,6-di-tert-butyl-4-methylphenyl 2-methyl-4-cyclohexylallophanate,
2,6-di-tert-butyl-4-methylphenyl 2-methyl-4-allylallophanate,
2,6-di-tert-butyl-4-methylphenyl 2-methyl-4-(2-butenyl)allophanate,
2,6-di-tert-butyl-4-methylphenyl 2-methyl-4-(1-cyclohexenyl)allophanate,
2,6-di-tert-butyl-4-methylphenyl 2-methyl-4-benzylallophanate,
2,6-di-tert-butyl-4-methylphenyl 2-methyl-4-phenylallophanate,
2,6-di-tert-butyl-4-methylphenyl 2-methyl-4-(p-nitrophenyl)allophanate,
2,6-di-tert-butyl-4-methylphenyl 2-methyl-4-(3-cyanophenyl)allophanate,
2,6-di-tert-butyl-4-methylphenyl 2-methyl-4-(p-methoxyphenyl)allophanate,
2,6-di-tert-butyl-4-methylphenyl 2-methyl-4-(p-methylmercaptophenyl)allophanate,
2,6-di-tert-butyl-4-methylphenyl 2-methyl-4-(2,4-dichlorophenyl)allophanate,
and 2,6-di-tert-butyl-4-methylphenyl 2-methyl-4-(2-naphthylmethyl)allophanate, respectively.

*Example 10.—Phenyl 2,4-diphenylallophanate*

Using the procedure described in Example 1, but replacing methyl isocyanate by phenyl isocyanate there is obtained phenyl 2,4-diphenylallophanate.

Similarly, using the procedure described in Example 1, but replacing methyl isocyanate by 2-cyanophenyl isocyanate, ethyl isocyanate, isobutyl isocyanate, octyl isocyanate, octadecyl isocyanate, allyl isocyanate, 2-octenyl isocyanate, cyclopentyl isocyanate, benzyl isocyanate, p-chlorobenzyl isocyanate, 3-phenylpropyl isocyanate, 1-naphthyl isocyanate, or 6-methoxy-2- naphthyl isocyanate there are obtained:

phenyl 2,4-di(2-cyanophenyl)allophanate,
phenyl 2,4-diethylallophanate,
phenyl 2,4-diisobutylallophanate,
phenyl 2,4-dioctylallophanate,
phenyl 2,4-dioctadecylallophanate,
phenyl 2,4-diallylallophanate,
phenyl 2,4-di(2-octenyl)allophanate,
phenyl 2,4-dicyclopentylallophanate,
phenyl 2,4-dibenzylallophanate,
phenyl 2,4-di(p-chlorobenzyl)allophanate,
phenyl 2,4-di(3-phenylpropyl)allophanate,
phenyl 2,4-di(1-naphthyl)allophanate, and
phenyl 2,4-di(6-methoxy-2-naphthyl)allophanate, respectively.

*Example 11.—Phenyl 2,4-dimethylthiolallophanate*

Using the procedure described in Example 1, but replacing phenol by thiophenol, there is obtained phenyl 2,4-dimethylthiolallophanate.

Similarly, using the procedure described in Example 1, but replacing phenol by 3-cyanophenol, 4-methoxyphenol, 4 - (1 - propenyl)phenol, 3,4 - dichlorophenol, 2 - fluoro- 4 - methoxyphenol, 4 - ethylmercaptophenol, 4 - tert.-amylthiophenol, and 4 - nitrothiophenol, there are obtained 3 - cyanophenyl, 4 - methoxyphenyl, 4 - (1-propenyl)phenyl, 3,4 - dichlorophenyl, 2 - fluoro - 4-methoxyphenyl, 4 - ethylmercaptophenyl, 2,4 - dimethylallophanates and 4 - tert - amylphenyl and 4-nitrophenyl 2,4-dimethylthioallophanate, respectively.

I claim:

1. A process for the preparation of a compound selected from the class consisting of hydrocarbyl 2,4-dihydrocarbyl allophanates and hydrocarbyl 2,4-dihydrocarbyl thiolallophanates which comprises reacting at a temperature of about 20° C. to about 125° C. approximately stoichiometric proportions of the appropriate hydrocarbyl isocyanate and a compound selected from the class consisting of hydrocarbyl N-hydrocarbylcarbamates and hydrocarbyl N-hydrocarbyl thiolcarbamates in the presence of about 0.01% to about 5% by weight of carbamate of an alkali metal derivative of a compound having the formula RXH wherein R is lower-hydrocarbyl and X is selected from the class consisting of O and S.

2. The process of claim 1 wherein the compound selected from the class consisting of hydrocarbyl N-hydrocarbylcarbamates and hydrocarbyl N-hydrocarbylthiolcarbamates which is employed as starting material is generated in situ by the reaction of approximately stoichiometric proportions of the appropriate hydrocarbyl isocyanate and a member selected from the group consisting of the appropriate hydrocarbyl alcohol and hydrocarbyl thiol.

3. The process of claim 1 wherein the compound having the formula RXH is a tertiary alkanol.

4. The process of claim 1 wherein the alkali metal derivative of the compound having the formula RXH is potassium tert.-butoxide.

5. A process for the preparation of a compound selected from the class consisting of aryl 2,4-dihydrocarbyl allophanates and aryl 2,4-dihydrocarbylthiolallophanates which comprises reacting at a temperature of about 20° C. to about 125° C. approximately stoichiometric proportions of the appropriate hydrocarbyl isocyanate and a compound selected from the class consisting of aryl N-hydrocarbylcarbamates and aryl N-hydrocarbylthiolcarbamates in the presence of about 0.01% to about 5% by weight of carbamate of an alkali metal derivative of a compound having the formula RXH wherein R is lower-hydrocarbyl and X is selected from the class consisting of O and S.

6. The process of claim 5 wherein the compound selected from the class consisting of aryl N-hydrocarbylcarbamates and aryl N-hydrocarbylthiolcarbamates is generated in situ by the reaction of approximately stoichiometric proportions of the corresponding hydrocarbyl isocyanate and a member selected from the group consisting of the appropriate phenol and appropriate thiophenol.

7. The process of claim 6 wherein the alkali metal derivative of the compound having the formula RXH is potassium tert.-butoxide.

8. A process for the preparation of phenyl 2,4-dimethylallophanate which comprises reacting approximately stoichiometric proportions of methyl isocyanate and phenyl N-methylcarbamate in the presence of an inert organic solvent and about 0.01% to about 5% by weight of carbamate of an alkali metal tert.-alkoxide at a temperature within the range of about 20° C. to about 125° C.

9. The process of claim 8 wherein the phenyl N-methylcarbamate is generated in situ by reaction of approximately stoichiometric proportions of methyl isocyanate and phenol.

10. A process for the preparation of 2,6-di-tert-butyl-4-methylphenyl 2,4-dimethylallophanate which comprises reacting approximately stoichiometric proportions of methyl isocyanate and 2,6-di-tert-butyl-4-methylphenyl N-methylcarbamate in the presence of an inert organic solvent and about 0.01% to about 5% by weight of carbamate of an alkali metal tert-alkoxide at a temperature within the range of about 20° C. to about 125° C.

11. The process of claim 10 wherein the 2,6-di-tert-butyl-4-methylphenyl N-methylcarbamate is generated in situ by reaction of approximately stoichiometric proportions of methyl isocyanate and 2,6-di-tert-butyl-4-methylphenol.

12. A process for the preparation of 3-tert-butylphenyl 2,4-dimethylallophanate which comprises reacting approximately stoichiometric proportions of methyl isocyanate and 3-tert-butylphenyl N-methylcarbamate in the presence of an inert organic solvent and about 0.01% to about 5% by weight of carbamate of an alkali metal tert-alkoxide at a temperature within the range of about 20° C. to about 125° C.

13. The process of claim 12 wherein the 3-tert-butylphenyl N-methylcarbamate is generated in situ by reaction of approximately stoichiometric proportions of methyl isocyanate and 3-tert-butylphenol.

14. A process for the preparation of p-tolyl 2,4-dimethylthiolallophanate which comprises reacting approximately stoichiometric proportions of methyl isocyanate and p-tolyl N-methylthiolcarbamate in the presence of an inert organic solvent and about 0.01% to about 5% by weight of carbamate of alkali metal tert-alkoxide at a temperature within the range of about 20° C. to about 125° C.

15. A process for the preparation of 2-chloro-4,5-dimethylphenyl 2,4-dimethylallophanate which comprises reacting approximately stoichiometric proportions of methyl isocyanate and 2-chloro-4,5-dimethylphenyl N-methylcarbamate in the presence of an inert organic solvent and about 0.01% to about 5% by weight of carbamate of an alkali metal tert-alkoxide at a temperature within the range of about 20° C. to about 125° C.

16. A process for the preparation of α-naphthyl 2,4-dimethylallophanate which comprises reacting approximately stoichiometric proportions of methyl isocyanate and α-naphthyl N-methylcarbamate in the presence of an inert organic solvent and about 0.01% to about 5% by weight of carbamate of an alkali metal tert-alkoxide at a temperature within the range of about 20° C. to about 125° C.

17. A process for the preparation of methyl 2,4-dimethylallophanate which comprises reacting approximately stoichiometric proportions of methyl isocyanate and methyl N-methylcarbamate in the presence of an inert organic solvent and about 0.01% to about 5% by weight of carbamate of an alkali metal tert-alkoxide at a temperature within the range of about 20° C. to about 125° C.

18. The process of claim 17 wherein the methyl N-methylcarbamate is generated in situ by the reaction of approximately stoichiometric proportions of methyl isocyanate and methanol.

References Cited

Ulrich et al.: "J. Org. Chem.," vol. 29, pp. 2401–2404 (1964).

CHARLES B. PARKER, *Primary Examiner.*

D. PHILLIPS, *Assistant Examiner.*